A. O. KOMPELIEN.
ANIMAL TRAP.
APPLICATION FILED FEB. 8, 1909.

926,880.

Patented July 6, 1909.

WITNESSES:
D. E. Carlsen.
E. C. Carlsen.

INVENTOR:
Anders O. Kompelien.
BY HIS ATTORNEY:
A. M. Carlsen.

UNITED STATES PATENT OFFICE.

ANDERS O. KOMPELIEN, OF DIETER, MINNESOTA.

ANIMAL-TRAP.

No. 926,880.   Specification of Letters Patent.   Patented July 6, 1909.

Application filed February 8, 1909. Serial No. 476,777.

*To all whom it may concern:*

Be it known that I, ANDERS O. KOMPELIEN, a citizen of the United States, residing at Dieter, in the county of Roseau and State of Minnesota, have invented a new and useful Animal-Trap, of which the following is a specification.

My invention relates to animal traps, and the main object is to provide a simple but efficient trap for catching otter, rabbits, bears, wolves and other animals without the use of bait.

Figure 1:
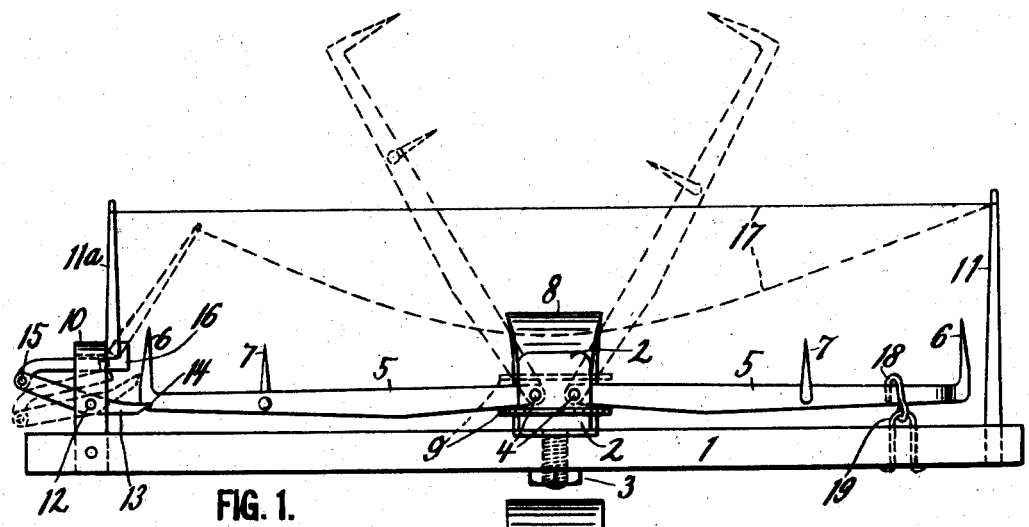
Figure 2:
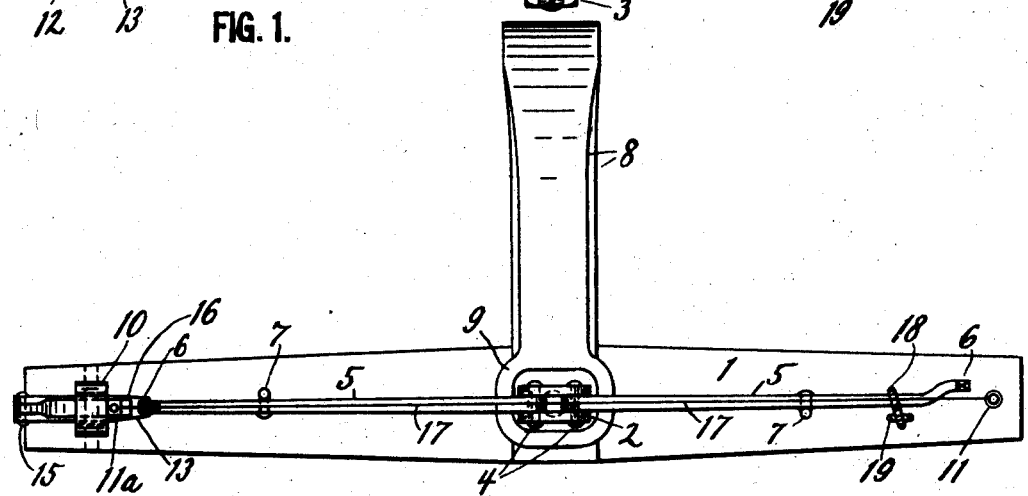
Figure 3:
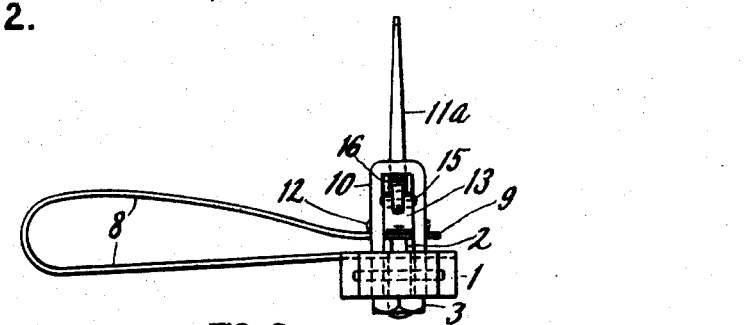

In the accompanying drawing, Figure 1 is a side elevation of my improved trap in set position and also in dotted lines as sprung and the jaws partly closed. Fig. 2 is a top or plan view of the trap in set position. Fig. 3 is a left hand end elevation of Fig. 1.

Referring to the drawing by reference numerals, 1 designates the main frame or base of the trap and may in small traps be made of iron, but in large traps it is preferable to make it of wood. In the middle of the base piece 1 I fix a bifurcated post 2 whose lower end in the present illustration is passed through the base and provided with a nut 3 below it though it may also or only be screw threaded in or otherwise fixed to the base. In the bifurcated top end of the post are mounted on two pivots 4, two arm-shaped jaws 5, having each at its free end a sharp finger or prong 6, and farther in on the arm one or more prongs 7. All of said prongs are intended to help hold the caught animal and they are so arranged on each jaw that they pass alternately at opposite sides of the other jaw.

At the base of the post 2 is mounted upon the base piece 1 a U-shaped spring 8, whose upper arm has an eye 9 adapted to close the jaws upward and by embracing them prevent their spreading by the caught animal.

The locking and tripping mechanism is as follows: Upon one end of the base bar is fixed a bracket 10 which is preferably arch-shaped and in the other end is placed a removable post 11. In the arch is pivotally mounted at 12 a trip-lever 13, whose inner end when the trap is set, engages in a notch 14 in the end of the adjacent jaw. To the outer end of the trip lever is pivoted at 15 an upwardly turned hook 16 adapted to hold the lower end of a post 11ᵃ against the inner edge of the top of the arch as shown in full lines in Fig. 1. Between the posts 11 and 11ᵃ is moderately stretched a string 17. To avoid accidental springing of the trap a hook 18 secured to the base by a staple 19, is placed over one of the jaws until the trap is fully set and placed in catching position, when the hook is carefully disengaged from the jaw.

The operation of the trap is easily understood. The spring 8 is depressed, the jaws spread to horizontal position, the stick or post 11ᵃ is put in upright position against the arch and engaged by the hook 16 while the trip lever engages the notch of the jaw and holds the jaw down as long as the post 11ᵃ remains in normal position. The trap is placed across paths or other runways or openings where an animal is expected to pass, the base and jaws being more or less concealed as circumstances may permit, and when the animal comes along and tries to traverse the string by passing either over or under it, the contact with the string pulls the trigger post 11ᵃ inward and as the post thereby forces the hook 16 below the crown of the arch the trip lever is free to swing upward with the end holding the jaw and thus to let the jaw escape upward, and the spring closes the jaws upon the sides of the animal or its neck or head and holds it firmly.

What I claim is:

1. An animal trap comprising an elongated base piece, a post fixed upon the middle of the base, a pair of jaw arms pivoted to the post and adapted to spread toward the ends of the base, a spring mounted on the base and having an arm with an eye on it adapted to raise and close the jaws above the post, a bracket fixed at one end of the base and a post at the other end thereof, a trip-lever pivoted to the bracket and engaging one of the jaws when the trap is set, a hook pivoted to the trip lever, a trigger post adapted to be held between said hook and a portion of the bracket, and a cord extending from said post to the post at the other end of the base.

2. An animal trap comprising an elongated base piece, a post fixed upon the middle of the base, a pair of jaw arms pivoted to the post and adapted to spread toward the ends of the base, a spring mounted on the base and having an arm with an eye on it adapted to raise and close the jaws above the post, a bracket fixed at one end of the base and a post at the other end thereof, a trip-lever pivoted to the bracket and engaging one of the jaws when the trap is set, a hook pivoted to the trip lever, a trigger post adapted to be held between said hook and a portion of the bracket, and a cord extending from said post to the post at the other end of the base, said jaws being substantially straight arms and having each one or more prongs so arranged as to pass at the sides of the other jaw when the trap is sprung and closed.

3. An animal trap comprising an elongated base piece, a post fixed upon the middle of the base, a pair of jaw arms pivoted to the post and adapted to spread toward the ends of the base, a spring mounted on the base and having an arm with an eye on it adapted to raise and close the jaws above the post, a bracket fixed at one end of the base and a post at the other end thereof, a trip-lever pivoted to the bracket and engaging one of the jaws when the trap is set, a hook pivoted to the trip lever, a trigger post adapted to be held between said hook and a portion of the bracket, and a cord extending from said post to the post at the other end of the base, said bracket having the form of an arch and said hook holding the trigger post against the crown of the arch and adapted to escape below the crown of the arch when the string operates the post.

In testimony whereof I affix my signature, in presence of two witnesses.

ANDERS O. KOMPELIEN.

Witnesses:
A. J. GILSETH,
J. A. JOHNSON.